United States Patent Office 3,541,182
Patented Nov. 17, 1970

3,541,182
ANTHRAQUINONE CONTAINING
MONOAZO DYESTUFFS
Hans Peter Kolliker, Munchenstein, and Mario Christen,
Reinach, Switzerland, assignors to J. R. Geigy A.G.,
Basel, Switzerland
No Drawing. Filed Feb. 20, 1967, Ser. No. 617,060
Int. Cl. C07c 107/04; C09b 43/00
U.S. Cl. 260—207.1                                8 Claims

ABSTRACT OF THE DISCLOSURE

Difficultly water-soluble 1-amino- and 1-lower alkylamino-4-phenylamino-anthraquinone dyestuffs free from salt-forming, water-solubilizing groups which dissociate acid in water, bearing in m- or p-position at the benzene nucleus of the phenylamino substituent a substituent of the formula —N=N—Z wherein Z represents an optionally substituted carbocyclic aromatic or heterocyclic aromatic radical and at the same benzene nucleus optionally further substituents, while the 2-position of the anthraquinone nucleus is occupied by an organically esterified or an amidified carboxyl group; these dyestuffs being suited particularly for the dyeing, from an aqueous dispersion, of hydrophobic organic fiber materials, e.g. polyglycol terephthalate type fibers, but also other polyester fibers and synthetic polyamide and polyacrylonitrile fibers; processes of dyeing such hydrophobic organic fiber materials with such dyestuffs, and such fiber materials dyed with such dyestuffs.

---

The present invention concerns new, difficultly water-soluble anthraquinone dyestuffs which are useful as dispersion dyestuffs, processes for the production thereof, processes for the dyeing of organic materials, particularly for the dyeing of organic hydrophobic fibre materials, especially of polyglycol terephthalate fibres, with the new dyestuffs, and organic materials dyed with the new anthraquinone dyestuffs.

The new, difficultly water-soluble dyestuffs of the anthraquinone series are obtained by condensing an anthraquinone compound of Formula I

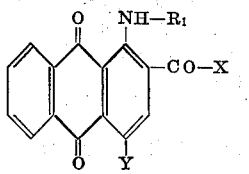

(I)

wherein
$R_1$ represents hydrogen or a lower alkyl group,
X represents the radical of an organic hydroxyl compound bound by way of an oxygen, or a primary, secondary or tertiary amino group, and
Y represents a mobile substituent enabling nucleophilic substitution, with an amine of Formula II

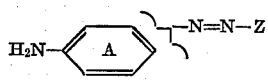

(II)

wherein
Z represents an optionally substituted carbocyclic-aromatic or heterocyclic-aromatic radical, and the benzene ring A can have other substituents, preferably such that do not dissociate acid in water, to form a compound of Formula III

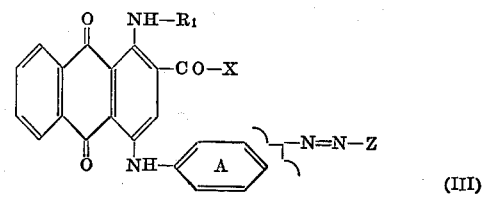

(III)

wherein $R_1$ and X have the meanings given for Formula I and Z and A have those given for Formula II. The starting compounds are to be so chosen that the final dyestuff does not contain any salt-forming, water-solubilising groups which dissociate acid in water such as sulphonic acid, carboxylic acid or phosphonic acid groups.

As lower alkyl group, $R_1$ represents, e.g. isopropyl, ethyl and, especially, methyl; preferably however, $R_1$ is hydrogen.

As radical of an organic hydroxyl compound bound by way of oxygen, X represents, for instance, the group —$OR_2$ wherein $R_2$ is an optionally substituted aliphatic, cycloaliphatic, carbocyclic-aromatic or heterocyclic-aromatic radical.

When X is a primary, secondary or tertiary amino group, then it is, particularly, a group of the formula

wherein $R_3$ is hydrogen or the same as $R_2$, $R_4$ is hydrogen or an optionally substituted aliphatic or cycloaliphatic radical, or $R_3$ and $R_4$ together with the nitrogen atom to which they are linked represent, optionally with the inclusion of another hetero atom, a 5- or 6-membered heterocyclic ring.

Accordingly, the dyestuffs according to the invention constitute two subclasses, one in which the 2-position of the anthraquinone nucleus is substituted by an esterified carboxyl group of the formula

and another subclass in which the aforesaid 2-position is occupied by an amidified carboxyl group of the formula

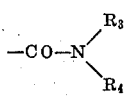

$R_2$, $R_3$ and $R_4$ having the meanings given above.

The dyestuffs of the first-mentioned subclass afford dyeings on hydrophobic fibers which are generally of greater light-fastness than those obtained with dyestuffs of the second subclass.

In each of these subclasses, the dyetuffs in which Z represents an optionally substituted mono- or dinuclear carbocyclic aromatic radical are more important because they are easier to produce than those in which Z is a heterocyclic-aromatic radical.

When $R_2$, $R_3$ and $R_4$ represent aliphatic radicals these are, e.g. straight or branched chain, optionally substituted alkyl or alkenyl groups, and in the latter case, particularly $\Delta^2$-alkenyl groups, having preferably up to 5 carbon atoms. As substituents, these aliphatic radicals can contain, e.g. hydroxyl or preferably alkoxy groups, such as unsubstituted alkoxy, alkoxyalkoxy or alkoxyalkoxyalkoxy groups, or alkoxycarbonyl groups, wherein the alkoxy moiety has from 1 to 3 carbon atoms. As substitutes, they can also contain carbocyclic rings, especially of aromatic character, such as the phenyl radical, or heterocyclic rings, such as the thienyl-(2), furyl-(2) or tetrahydrofuryl-(2) radical.

Cycloaliphatic radicals symbolised by $R_2$, $R_3$ and $R_4$ are, e.g. cycloalkyl groups with, preferably, 5- or 6-membered rings and, especially, the cyclohexyl or methyl-cyclohexyl group.

As carbocyclic-aromatic radicals represented by $R_2$ and $R_3$, mononuclear substituents of the benzene series are preferred, especially an unsubstituted phenyl group or a phenyl group substituted by at least one and preferably not more than three of the following substituents: nitro, chlorine, bromine, fluorine, alkyl, alkoxy, and/or one of the substituents hydroxy-alkyl, alkoxy-carbonyl, alkyl-sulfonyl or alkyl-sulfonyloxy, "alkyl" and "alkoxy" portions having at most 4 carbon atoms.

If $R_2$ and $R_3$ represent heterocyclic-aromatic radicals, then these are preferably 5- to 6-membered cyclic radicals, especially nitrogen-containing rings of aromatic character, e.g. pyridine radicals, more partcularly the pyridyl-(3) radical.

When $R_3$ and $R_4$ together with the nitrogen atom to which they are linked represent a 5- or 6-membered heterocyclic ring, then this is, e.g., the pyrrolidino, piperidino, piperazino, thiomorpholino or, especially, the morpholino ring.

Dyestuffs falling under Formula III in which $R_2$ represents an alkyl radical having at most 3 carbon atoms or such an alkyl radical substituted by alkoxy, alkoxyalkoxy or alkoxyalkoxyalkyl groups having from 1 to 3 carbon atoms per alkoxy portion, or in which each of $R_3$ and $R_4$ represent an alkyl group having at most 3 carbon atoms, have particularly good drawing power onto organic hydrophobic fibres and good fastness to sublimation and to light.

When Z is a carbocyclic-aromatic radical, then it it, e.g. a naphthyl or preferably a mononuclear residue of the benzene series.

When Z is a heterocyclic-aromatic radical, then it is for example an azolyl radical which can be condensed, particularly with a benzene nucleus. Examples are 2-lower alkyl-indoyly-(3) radicals, the diazolyl radicals such as pyrazolyl radicals, e.g. 1-lower alkyl-pyrazolyl-(5) or 1-phenyl-3-lower alkyl-5-hydroxypyrazolyl-(4) radicals, 1-lower alkyl-indazolyl-(3) radicals or imidazolyl radicals, e.g. benzimidazolyl-(2) radicals, or the thiazolyl radicals such as thiazolyl-(2) or benzothiazolyl-(2) radicals. Also azinyl groups, e.g. pyridyl groups such as the pyridyl-(3) group can be in the position of Z.

The carbocyclic-aromatic rings in X and Z as well as the benzene ring A can contain other substituents which do not dissociate acid in water, rendering the dyestuffs water-soluble, and do not elongate the resonance system, hence not detrimentally affecting the purity of the shade of the dyestuffs; suitable substituents are especially halogen, e.g. fluorine, chlorine or bromine, nitro, lower alkyl, hydroxy-lower alkyl, lower alkoxy, but also lower alkoxy-carbonyl, lower alkyl-sulfonyl or lower alkylsulfonyloxy groups.

In the specification, including the claims, the term "lower" applied to "alkyl" and "alkoxy" means such groups having 1 to 5 carbon atoms.

In preferred dyestuffs falling under Formula III, which are distinguished by good drawing power and fastness to sublimation and light, Z represents an unsubstituted phenyl or naphthyl radical, or a naphthyl or, especially, a phenyl group substituted by at least one and preferably not more than three of the following substituents: nitro, chlorine, bromine, fluorine, alkyl, alkoxy, and/or one of the substituents hydroxy-alkyl, alkoxy-carbonyl, alkyl-sulfonyl or alkyl-sulfonyloxy, "alkyl" and "alkoxy" portions having at most 4 carbon atoms; ring A in these preferred dyestuffs is either without additional substituents apart from the grouping —N=N—Z, or substituted by methyl, methoxy and/or chlorine.

Most preferred are those of the above class of dyestuffs falling under Formula III in which Z represents a phenyl- or methyl-substituted phenyl group and in which $R_2$ or, as the case may be, $R_3$ and $R_4$ have the above-mentioned preferred significance.

In these most preferred dyestuffs, the ring A is either without further substitution or bears one or several, preferably not more than three, methyl groups.

In the starting compounds of Formula I, Y, as mobile substituent enabling nucleophilic substitution, represents e.g. halogen such as chlorine or bromine, a lower alkoxy group such as the methoxy or ethoxy group, the hydroxyl or the nitro group. Preferably, however, Y is bromine, or also chlorine.

Some of the starting materials of Formula I are known or can be produced by methods known per se, e.g. by converting an anthraquinone-2-carboxylic acid of the formula

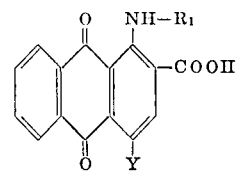

into its carboxylic acid chloride or bromide and reacting the latter with an organic hydroxyl compound, ammonia or a primary or secondary amine.

Examples of starting materials of Formula I are:

1-amino-2-carbalkoxy-,
1-amino-2-carbo-(hydroxyalkoxy)-,
1-amino-2-alkoxycarbalkoxy-,
1-amino-2-carbo-(phenylalkoxy)-,
1-amino-2-carbofurfuryloxy- or
1-amino-2-carbo-tetrahydrofurfuryloxy-4-chloro- or
-4-bromo-anthraquinones,
1-amino-2-carbocyclo-alkoxy-4-chloro- or
-4-bromo-anthraquinones,
1-amino-2-carbophenoxy-4-chloro- or
-4-bromo-anthraquinone,
1-amino-2-carbo-(pyridyloxy)-4-chloro- or
-4-bromo-anthraquinone,
1-amino-4-chloro- or
-4-bromo-anthraquinone-2-carboxylic acid amide,
-2-carboxylic acid-N-alkylamides,
-2-carboxylic acid-N-cyclo-alkylamides,
-2-carboxylic acid-N,N-dialkylamides,
-2-carboxylic acid-N-hydroxyalkylamides,
-2-carboxylic acid-N,N-bis-hydroxyalkylamides,
-2-carboxylic acid-N-alkyl-N-arylamides,
-2-carboxylic acid-N-pyridylamide,
-2-carboxylic acid-N-alkyl-N-phenalkylamides or
-2-carboxylic acid piperidide or
morpholide, as well as the corresponding 1-methylamino analogues.

The greater part of the aminoazo compounds of Formula II which can be used as starting materials are also known or they can be produced by the usual methods by coupling diazotised nitroanilines or acylamino anilines with coupling components and subsequent reduction of the nitro group or hydrolysis of the acylamino group to the amino group.

The condensation of starting materials of Formula I with the amines of Formula II is performed, e.g. with an excess of amine in a melt at 70–250° C. It is preferably performed, however, in an inert organic solvent at reaction temperatures of 100–160° C. in the presence of an acid binding agent and a catalyst.

Aromatic hydrocarbons such as toluene or xylenes, halogenated aromatic hydrocarbons such as chlorobenzene or dichlorobenzenes, or nitrated aromatic hydrocarbons such as nitrobenzene can be used, for example, as inert organic solvents. Alcohols are particularly suitable, especially alkanols having at least two carbon atoms, e.g. ethanol, n- or iso-propanol, butanols or amyl alcohols, or alkylene glycols and their monoalkyl ethers, e.g. ethylene glycol and its monomethyl or monoethyl ether.

Alkali metal hydroxides, particularly sodium or potassium hydroxides, alkali metal carbonates, especially sodium or potassium carbonate and alkali metal salts of lower fatty acids such as alkali metal acetates are mentioned as preferred acid binding agents.

Copper or copper-(I) salts such as copper-(I) acetate or chloride are mentioned as preferred catalysts.

A modification of the process according to the invention for the production of new, difficultly water-soluble anthraquinone dyestuffs of Formula III consists in condensing an anthraquinone compound of Formula IV

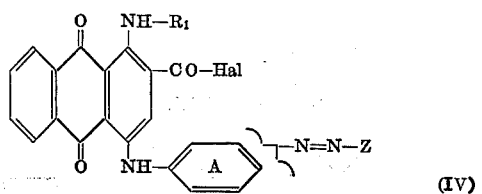

(IV)

wherein Hal represents chlorine or bromine and $R_1$ has the meaning given for Formula I, and Z and A have those given for Formula II, with a compound of Formula V $$H-X \qquad (V)$$

wherein X has the meaning given for Formula I, to form a compound of Formula III, the components being so chosen that the final dyestuff contains no salt-forming, water-solubilising groups which dissocate acid in water.

The anthraquinone compound of Formula IV is obtained, e.g. be reacting the corresponding anthraquinone-2-carboxylic acid with a halogenating agent such as thionyl chloride or phosphorus pentachloride by usual methods.

The condensation of the anthraquinone compound of Formula IV with the compound of Formula V is performed in a known way, advantageously in an inert organic solvent, e.g. in an aromatic hydrocarbon, halogenated or nitrated hydrocarbon or in water and, optionally, in the presence of acid binding agents.

A second modification of the process according to the invention for the production of compounds of Formula III wherein $R_1$ is hydrogen consists in reducing an anthraquinone compoud of Formula VI

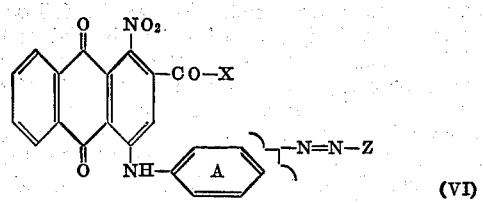

(VI)

wherein X has the meaning given for Formula I, and Z and A have those given for Formula II, the components being so chosen that the end product obtained does not contain any salt-forming, water-solubilising groups which dissociate acid in water.

The reduction is advantageously performed with water-soluble sulphides or hydrogen sulphides in aqueous dispersion or in aqueous-organic solution or dispersion. The organic part of such mixtures preferably consists of water-miscible, inert, organic solvents such as tertiary nitrogen bases, e.g. pyridine or homologues thereof, or it consists of amides of low fatty acids such as N,N-dimethyl formamide, or of aliphatic alcohols e.g. alkylene glycol monoalkyl ethers, for example ethylene glycol monomethyl or monoethyl ether.

A third modification of the process according to the invention for the production of new, difficultly water-soluble anthraquinone dyestuffs of Formula III consists in condensing an anthraquinone compound of Formula VII

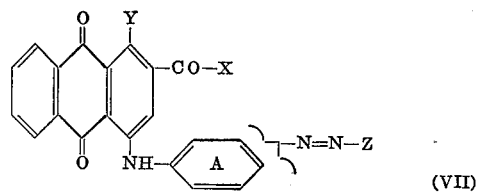

(VII)

wherein X and Y have the meanings for Formula I, and Z and A have those given for Formula II, with an amine of Formula VIII $$H_2N-R_1 \qquad (VIII)$$

wherein $R_1$ has the meaning given for Formula I, the starting compounds being so chosen that the end product obtained does not contain any salt-forming, water-solubilising groups which dissociate acid in water.

Starting materials of Formula VII are obtained, for example, by condensing equivalent amounts of an anthraquinone compound of the formula

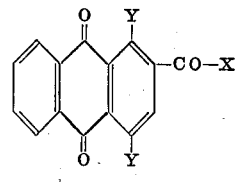

with an aminoazo compound of the formula

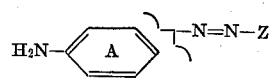

wherein A, X, Y and Z have the meanings given above.

A further modification of the process according to the invention for the production of anthraquinone dyestuffs of Formula III wherein X represents a primary, secondary or tertiary amino group, consists in condensing an anthraquinone compound of Formula IX

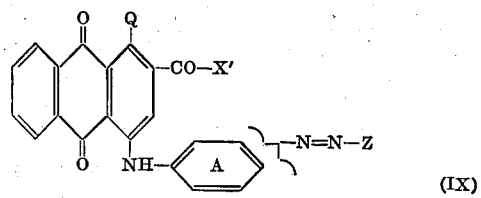

(IX)

wherein

X′ represents the radical of an organic hydroxyl compound bound by way of oxygen, Q represents a nitro or an amino group —NH—$R_1$, $R_1$ being hydrogen or a lower alkyl group, and Z and A have the meanings given for Formula II, with ammonia or a primary or secondary amine and, if Q is a nitro group, reducing said nitro group simultaneously to the amino group —$NH_2$, the starting compounds being so chosen that the end product obtained does not contain any salt-forming, water-solubilising groups which dissociate acid in water.

The conversion of the esters of Formula IX into the corresponding amides and optional reduction of the nitro group are carried out, preferably in an excess of ammonia or amines, and, optionally, in the presence of inert organic solvents such as given above for the other processes.

When producing the new anthraquinone dyestuffs of Formula III, they generally precipitate from the reaction mixture or they can be precipitated from the reaction mixture by the addition of water or of water-miscible, inert organic solvents, e.g. lower alkanols. In the pure state, they are shimmering deeply coloured, crystalline substances.

Advantageously, the dyestuffs according to the invention are brought into a finely distributed form by milling with dispersing agents. For this purpose, anionic dispersing agents, e.g. alkylaryl sulphonates, condensation products of formaldehyde and naphthalene sulphonic acids, lignin sulphonates, or non-ionogenic dispersing agents such as fatty alcohol or higher alkylphenyl polyglycol ethers are suitable. The dyestuffs according to the invention are preferably milled with such dispersing agents with the addition of water. The resultant, aqueous dyestuff pastes which contain the dyestuffs in finely distributed form can either be used direct for dyeing or they can be formulated into non-dusty powders by careful drying according to known methods.

In such preparations, the dyestuffs according to the invention are suitable for the dyeing of organic material, particularly of hydrophobic organic fibre material, from an aqueous dispersion, e.g. for the dyeing of cellulose ester fibres such as cellulose di-, 2½- or tri-acetate, preferably however, they are suitable for the dyeing of textile fibres made from polyesters of aromatic polycarboxylic acids with polyvalent alcohols such as polyglycol terephthalate, polyglycol isophthalate or polycyclohexane diol terephthalate fibres.

The dyestuffs can also be used, however, for the dyeing of synthetic polyamide fibres such as polyamide 6, 66 or 11.

In some cases, also valuable dyeings can be attained with the dyestuffs according to the invention on polyacrylonitrile fibres.

Polyglycol terephthalate fibres are dyed with aqueous dispersions of dyestuffs according to the invention, for example, at temperatures of over 100° C. under pressure. Dyeing can also be peformed, however, at the boiling point of the dye liquor in the presence of carriers, e.g. alkali phenyl phenolates such as sodium-o-phenyl phenolate, polychlorobenzene compounds or similar auxiliaries. Very good dyeings are also obtained if these fibres are impregnated with concentrated aqeuous dispersions of dyestuffs according to the invention, then squeezed out, dried and the dyestuffs are finally fixed at temperatures of 100–250° C. In many cases, the drawing power of the dyestuffs onto these fibres and the stability of the aqueous dispersions in the dye liquor can be improved by mixing two or more dyestuffs of similar composition of which at least one is embraced by Formula III.

Compared with corresponding dyeings attained wih known green dyestuffs of similar constitution under the same conditions, the green dyeings attained with the dyestuffs according to the invention on hydrophobic polyester fibre material, particularly polyglycol terephthalate fibres, have a substantially greater colour strength and/or fastness to sublimation and to light. The colour strength may be improved as much as 50 to 100%. Moreover, vegetable and animal fibres, particularly cotton, are well reserved by the dyestuffs according to the invention. Another advantage of the dyestuffs according to the invention is that they are suitable for use in the so-called thermosol dyeing process, for which high grade fastness to sublimation is a prerequisite. When used in this way, they also provide level, green dyeings which are fast to rubbing.

Practically all polymeric hydrophobic materials can be dope-dyed with the dyestuffs according to the invention. Hydrophobic organic fibres and especially the above mentioned synthetic polyester fibres, e.g. the fibres consisting of linear high molecular ester of aromatic polycarboxylic acid with polyfunctional alcohol can be dyed from an aqueous dispersion of the dyestuffs according to the invention.

Colouration of the organic materials is effected in either case by penetration of dyestuff molecules into the organic material, especially the fibres, and partial reagglomeration to larger dyestuff particles in the interior of the fibres.

The following non-limitative examples illustrate the invention further. The temperatures are given therein in degrees centigrade. Percentages are given by weight.

EXAMPLE 1

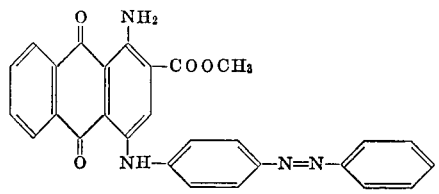

36 g. of 1 - amino - 2-carbomethoxy-4-bromoanthroquinone, 59 g. of 4-aminoazobenzene, 22.1 g. of anhydrous potassium acetate and 1 g. of copper-(I) chloride are added to 100 g. of amyl alcohol, the reaction mixture is stirred until homogeneity is attained and kept for 10 hours at 130–135°. The reaction mixture, which has become yellow-green coloured, is then cooled to 90°, 200 g. of ethanol are added and then it is stirred for another 3–4 hours at room temperature. The dyestuff of the above formula precipitates as a dark grey-green crystalline powder. This is separated by filtration, washed, dried and recrystallized to further purify from ethylene glycol monomethyl ether.

From aqueous dispersion, the new dyestuff dyes polyethylene glycol terephthalate fibre material in clear green shades which have very good fastness to light and sublimation.

If, instead of the 36 g. of 1-amino-carbomethoxy-4-bromoanthraquinone, equimolar amounts of one of the anthraquinone compounds given in the following table, columns I and II, are used and if, instead of the 59 g. of 4-aminoazobenzene, equimolar amounts of one of the aminoazo compounds given in column III of the same table are used, then with otherwise the same procedure as given in the example, dyestuffs are obtained which dye polyglycol terephthalate fibre material in the shades given in column IV of this table. The dyeings are also fast to light and sublimation.

TABLE
Anthraquinone compound
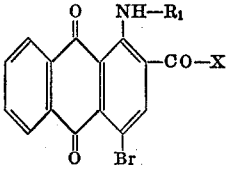
| No. | —NH—R₁ | —CO—X | Aminoazo compound | Shade of dyeing on polyglycol terephthalate fibres |
|---|---|---|---|---|
| 2 | —NH₂ | —COOC₂H₅ | 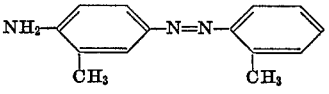 | Green. |
| 3 | —NH₂ | —COOC₂H₅ | 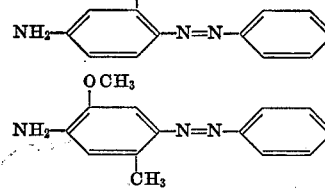 | Do. |
| 4 | —NH₂ | —COOC₂H₅ | 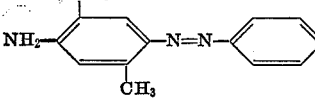 | Do. |
| 5 | —NH₂ | —COOC₂H₅ | 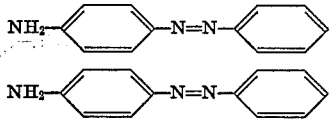 | Do. |
| 6 | —NHCH₃ | —COOC₂H₅ | 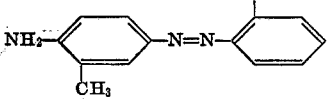 | Do. |
| 7 | —NH₂ | —COOCH₂CH₂OCH₃ | 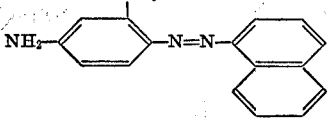 | Do. |
| 8 | —NH₂ | —COOCH₂CH₂OCH₃ | 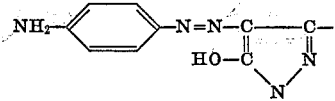 | Do. |
| 9 | —NH₂ | —COOCH₂CH₂OH |  | Do. |
| 10 | —NH₂ | —COOC₂H₅ | 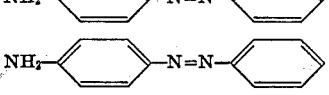 | Yellowish green. |
| 11 | —NH₂ | —COO— $\bigcirc$ H | 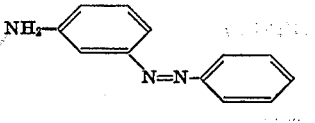 | Green. |
| 12 | —NH₂ | —COOCH₂— $\bigcirc$ H/O | | Do. |
| 13 | —NHC₂H₅ | —COOCH₃ |  | Do. |

TABLE—Continued

| No. | Anthraquinone compound −NH−R₁ | −CO−X | Aminoazo compound | Shade of dyeing on polyglycol terephthalate fibres |
|---|---|---|---|---|
| 14 | −NH₂ | −COOCH₂CH₂OH | [aminophenyl-azo-pyrazole with H₂N−C, C−CH₃, N-phenyl substituents] | Yellowish green. |
| 15 | −NHCH₃ | −COOCH₃ | NH₂−C₆H₄−N=N−C₆H₅ | Green. |
| 16 | −NH₂ | −COO−C₆H₅ | NH₂−C₆H₄−N=N−(1-methylindazol-3-yl) | Do. |
| 17 | −NH₂ | −COOC₃H₇ | NH₂−C₆H₄−N=N−C₆H₅ | Do. |
| 18 | −NH₂ | −COOC₄H₉ | NH₂−(3-methylphenyl)−N=N−(thiazol-2-yl) | Do. |
| 19 | −NH₂ | −COO−C₆H₁₁ | NH₂−C₆H₄−N=N−(benzimidazol-2-yl) | Do. |
| 20 | −NH₂ | −COOCH₂−C₆H₅ | NH₂−C₆H₄−N=N−(2-methylindol-3-yl) | Do. |
| 21 | −NH₂ | −COOCH₂CH₂CH₂OH | NH₂−C₆H₄−N=N−C₆H₅ | Do. |
| 22 | −NH₂ | −COOC₅H₁₁ | NH₂−(3-methylphenyl)−N=N−(benzothiazol-2-yl) | Do. |
| 23 | −NHC₃H₇ | −COOCH₂CH₂OCH₃ | NH₂−C₆H₄−N=N−C₆H₅ | Do. |
| 24 | −NH₂ | −COO−C₆H₄−CH₃ | NH₂−C₆H₄−N=N−C₆H₅ | Do. |
| 25 | −NH₂ | −CO(OCH₂CH₂)₂CH₃ | NH₂−C₆H₄−N=N−C₆H₅ | Do. |

TABLE—Continued

Anthraquinone compound $$\text{structure: anthraquinone with NH-R}_1, \text{CO-X, and Br substituents}$$

| No. | —NH—R₁ | —CO—X | Aminoazo compound | Shade of dyeing on polyglycol terephthalate fibres |
|---|---|---|---|---|
| 26 | —NH₂ | —COO—CH₂—(furyl) | ....do | Green. |
| 27 | —NH₂ | —COOCH(CH₃)₂ | ....do | Do. |
| 28 | —NH₂ | —COOCH(CH₃)(C₂H₅) | ....do | Do. |
| 29 | —NH₂ | —COOC(CH₃)₃ | ....do | Do; |
| 30 | —NH₂ | —COOC(CH₃)₂(C₂H₅) | NH₂—C₆H₄—N=N—C₆H₅ | Do. |
| 31 | —NH₂ | —COO—(pyridyl) | NH₂—C₆H₄—N=N—C₆H₅ | Do. |
| 32 | —NH₂ | —COOCH₂—CH=CH₂ | NH₂—C₆H₄—N=N—C₆H₅ | Do. |
| 33 | —NH₂ | —COOC₂H₅ | NH₂—C₆H₄—N=N—C₆H₄—NO₂ | Do. |
| 34 | —NH₂ | —COOC₂H₅ | NH₂—C₆H₄—N=N—C₆H₄(CH₃) | Do. |
| 35 | —NH₂ | —COOCH₂CH₂OCH₃ | NH₂—C₆H₄—N=N—(naphthyl) | Do; |
| 36 | —NH₂ | —CO(OCH₂CH₂)₃OC₂H₅ | NH₂—C₆H₄—N=N—C₆H₅ | Do; |
| 37 | —NH₂ | —COOCH₂CH₂CH₂OCH₃ | NH₂—C₆H₄—N=N—C₆H₄—Br | Do. |
| 38 | —NH₂ | —COOCH₃ | NH₂—C₆H₄—N=N—C₆H₄—F | Do. |
| 39 | —NH₂ | —COOCH(CH₃)(CH₂OCH₃) | NH₂—C₆H₄—N=N—C₆H₅ | Do. |
| 40 | —NH₂ | —COOCH(CH₃)(COOC₂H₅) | NH₂—C₆H₄—N=N—C₆H₅ | Do; |
| 41 | —NH₂ | —COOC₂H₅ | NH₂—C₆H₄—N=N—C₆H₄—SO₂CH₃ | Do. |
| 42 | —NH₂ | —COOCH₃ | NH₂—C₆H₄—N=N—C₆H₄(COOCH₃) | Do. |
| 43 | —NH₂ | —COOC₂H₅ | NH₂—C₆H₄—N=N—C₆H₄—OSO₂CH₃ | Do. |
| 44 | —NHCH₃ | —CONHCH₃ | NH₂—C₆H₃(CH₃)—N=N—(1-methylpyrazolyl) | Do. |
| 45 | —NH₂ | —CON(CH₂CH₂OH)₂ | NH₂—C₆H₃(CH₃)—N=N—(pyridyl) | Do. |

TABLE—Continued

Anthraquinone compound:

structure with C=O, NH-R₁, CO-X, Br, O

| No. | —NH—R₁ | —CO—X | Aminoazo compound | Shape of dyeing on polyglycol terephthalate fibres |
|---|---|---|---|---|
| 46 | —NHCH₃ | —CON(CH₂CH₂)₂CH₂ (piperidino) | NH₂—C₆H₄—N=N—C₆H₅ | Green. |
| 47 | —NH₂ | —CON(CH₂CH₂)₂O (morpholino) | NH₂—C₆H₄—N=N—C₆H₅ | Do. |
| 48 | —NH₂ | —CONHCH₂CH₂OH | NH₂—C₆H₃(CH₃)—N=N—C₆H₃(CH₃) | Do. |
| 49 | —NH₂ | —CONHCH₂—C₆H₅ | NH₂—C₆H₄—N=N—C₆H₅ | Do. |
| 50 | —NH₂ | —CONH₂ | NH₂—C₆H₄—N=N—C₆H₅ | Do. |
| 51 | —NH₂ | —CON(CH₃)₂ | NH₂—C₆H₄—N=N—C₆H₅ | Do. |
| 52 | —NH₂ | —CONHCH₃ | NH₂—C₆H₄—N=N—C₆H₄—OCH₃ | Do. |
| 53 | —NH₂ | —CON(CH₃)₂ | NH₂—C₆H₄—N=N—C₆H₄—OCH₃ | Do. |
| 54 | —NH₂ | —CONH—C₆H₅ | NH₂—C₆H₄—N=N—C₆H₄—OCH₃ | Do. |
| 55 | —NH₂ | —CO—NH—C₆H₄—OCH₃ | NH₂—C₆H₄—N=N—C₆H₄—OCH₃ | Do. |
| 56 | —NH₂ | —CON(C₂H₅)₂ | NH₂—C₆H₃(CH₃)—N=N—(1H-indazol-3-yl) | Do. |
| 57 | —NH₂ | —CONH—C₆H₁₁ (cyclohexyl) | NH₂—C₆H₄—N=N—C₆H₄—OCH₃ | Do. |
| 58 | —NH₂ | —CON(CH₃)(CH₂CH₂CH₃) | NH₂—C₆H₄—N=N—C₆H₅ | Do. |
| 59 | —NH₂ | —CO—NH—C₆H₄—CH₃ | NH₂—C₆H₄—N=N—C₆H₅ | Do. |
| 60 | —NH₂ | —CO—NH—(2-pyridyl) | NH₂—C₆H₄—N=N—C₆H₅ | Do. |
| 61 | —NH₂ | —CO—NH—CH₂—CH=CH₂ | NH₂—C₆H₄—N=N—C₆H₅ | Do. |
| 62 | —NH₂ | —CO—O—C₆H₁₀—CH₃ (cyclohexyl-CH₃) | NH₂—C₆H₄—N=N—C₆H₅ | Do. |
| 63 | —NH₂ | —CO—O—C₆H₃(CH₃)₂ | NH₂—C₆H₄—N=N—C₆H₄—CH₃ | Do. |

TABLE—Continued

Anthraquinone compound

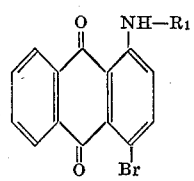

| No. | —NH—R₁ | —CO—X | Aminoazo compound | Shade of dyeing on polyglycol terephthalate fibres |
|---|---|---|---|---|
| 64 | —NH₂ | —CO—O—C₆H₄(OCH₃) | NH₂—C₆H₃(CH₃)—N=N—C₆H₅ | Green. |
| 65 | —NH₂ | —CO—O—C₆H₄(NO₂) | NH₂—C₆H₄—N=N—C₆H₅ | Do. |
| 66 | —NHCH₃ | —CO—O—C₆H₄—Cl | NH₂—C₆H₄—N=N—C₆H₄—CH₂CH₂OH | Do. |
| 67 | —NH₂ | —CO—O—C₆H₄—Br | NH₂—C₆H₄—N=N—C₆H₄—CH₂CH₂OH | Do. |
| 68 | —NH₂ | —CO—O—C₆H₃(Cl)(Cl) | NH₂—C₆H₄—N=N—C₆H₄—CH₂CH₂OH | Do. |
| 69 | —NH₂ | —CO—O—C₆H₂(Cl)(Cl)(Cl) | NH₂—C₆H₄—N=N—C₆H₄—CH₂CH₂OH | Do. |
| 70 | —NH₂ | —CO—O—C₆H₄(F) | NH₂—C₆H₄—N=N—C₆H₄—CH₂CH₂OH | Do. |
| 71 | —NH₂ | —CO—O—C₆H₄—CH₂CH₂OH | NH₂—C₆H₄—N=N—C(OH)=C(CH₃)—N—N(C₆H₄Cl) (pyrazolyl) | Do. |
| 72 | —NH₂ | —CO—O—C₆H₄—CO—OCH₃ | NH₂—C₆H₄—N=N—C₆H₅ | Do. |
| 72a | —NH₂ | —CO—OC₂H₅ | NH₂—C₆H₄—N=N—C₅H₄N (pyridyl) | Do. |
| 73 | —NH₂ | —CO—O—C₆H₄(SO₂C₂H₅) | NH₂—C₆H₄—N=N—C₆H₅ | Do. |
| 74 | —NH₂ | —CO—O—C₆H₄—O—SO₂—CH₃ | NH₂—C₆H₄—N=N—C₆H₅ | Do. |

EXAMPLE 75

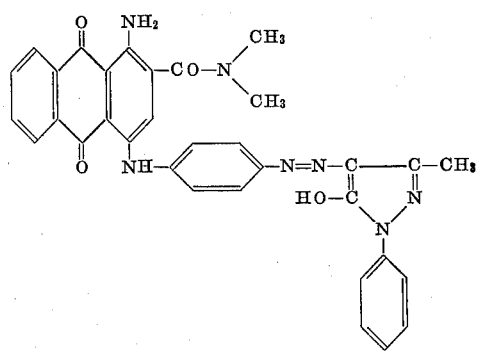

102 g. of 4-(1'-phenyl-3'-methyl-5'-hydroxy)-parazolyl-(4'-azo)-1-aminobenzene, 37.3 g. of 1-amino-4-bromoanthraquinone-2-carboxylic acid-N,N-dimethylamide, 25 g. of anhydrous potassium acetate and 1 g. of copper-(I) acetate in 200 g. of ethylene glycol monethyl ether are stirred for 15 hours at 130–135° and then 150 g. of methanol are added at 80°. The reaction product of the above formula precipitates in a finely crystalline form. It is separated by filtration, washed, dried and recrystallised from pyridine.

After developing at about 200° on polyglycol terephthalate fabric which has been impregnated with the aqueous dispersion of this dyestuff and then dried, a deep

EXAMPLE 76

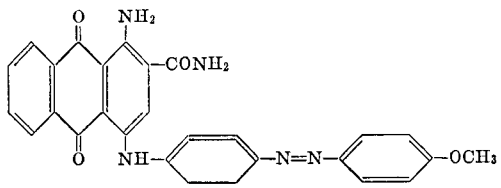

34.5 g. of 1-amino-4-bromoanthraquinone-2-carboxylic acid amide, 90 g. of 4-amino-4'-methoxyazobenzene, 10 g. of sodium bicarbonate and 1.6 g. of copper-(I) acetate in 150 g. of isoamyl alcohol are stirred for 8 hours at 120–130°. 100 g. of ethanol are then added to the reaction mixture; it is cooled to room temperature whereupon the condensation product of the above formula precipitates. It is separated by filtration, washed and dried.

The new dyestuff draws from aqueous dispersion onto polyglycol terephthalate or cellulose triacetate fabric in clear green shades which have very good fastness to sublimation.

EXAMPLE 77

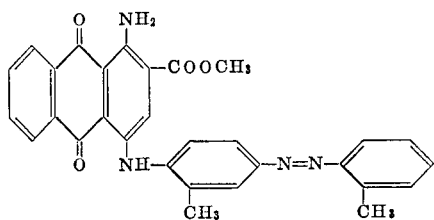

31.6 g. of 1-amino-2-carbomethoxy-4-chloroanthraquinone, 67.5 g. of 4-amino-3,2'-dimethyl-azobenzene, 22.1 g. of anhydrous potassium acetate and 1 g. of copper-(I) chloride in 120 g. of n-butanol are stirred for 24 hours at 115–120°, the reaction mixture is cooled to room temperature and 180 g. of methanol are added. The dyestuff of the above formula precipitates from the solution in finely crystalline form. It is separated by filtration, washed and dried.

The dyestuff obtained is mixed in a weight ratio of 1:1 with the dyestuff obtained according to Example 1. The mixture is milled with sand to attain a fine distribution and disparsed in a condensation product of naphthalene sulphonic acids and formaldehyde. From this dispersion the dyestuff mixture draws onto polyglycol terephthalate fibre material in vivid green shades which are fast to wet, light and, particularly, sublimation.

EXAMPLE 78

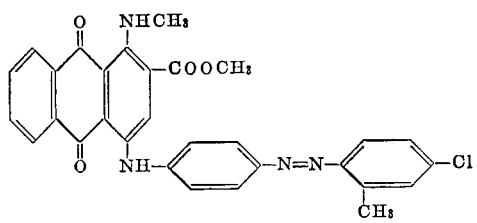

54.4 g. of condensation product of 1-chloro-2-carbomethoxy-4-bromoanthraquinone and 4-amino-2'methyl-4'-chloroazobenzene are stirred for 5 hours at 35–40° in 200 g. of a 35% aqueous solution of methylamine. The reaction mixture is cooled to 10–15°, the reaction product formed of the above formula is separated by filtration, washed with water until the reaction is neutral and dried. The dyestuff obtained dyes polyglycol terephthalate fabric from an aqueous dispersion by the thermosol process in clear green shades which have excellent fastness to wet, sublimation and light.

EXAMPLE 79

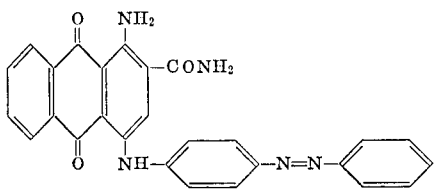

52 g. of 1-nitro-2-carbethoxy-4-(4'-phenylazo-phenylamino)-anthraquinone are slurried in 500 ml. of ethanol. A stream of ammonia is introduced for half an hour into this dispersion until saturation is attained whereupon the dispersion is heated to 60–70° in a steel autoclave while stirring or shaking. At 15 minute intervals, the ammonia used up by the reaction is replaced by application of ammonia from a steel cylinder in such a manner that the pressure in the reaction vessel remains constant. The reaction mixture is then kept for another hour at this temperature and cooled to room temperature, whereupon the obtained residue is filtered off, washed with water until the reaction is neutral and then dried.

The dyestuff is a dark grey-blue crystalline powder. It dyes polyglycol terephthalate fibres from an aqueous dispersion in clear green shades which have excellent light and sublimation fastness.

The same dyestuff is obtained if instead of 52 g. of 1-nitro - 2 - carbethoxy - 4-(4'-phenylazo-phenylamino)-anthraquinone, 49.2 g. of 1 - amino-2-carbethoxy-4-(4'-phenylazo-phenylamino)-anthraquinone or 49.3 g. of 1-nitro - 2 - carbamyl - 4-(4'-phenylazo-phenylamino)-anthraquinone are used as starting materials and otherwise the condensation is carried out as described above.

EXAMPLE 80

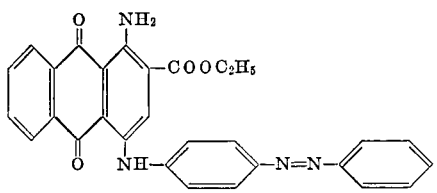

16 g. of 70% sodium hydrogen sulphide are added at 85–90° to the partial solution of 52 g. of 1-nitro-2-carbethoxy-4-(4'-phenylazo-phenylamino)-anthraquinone in 300 g. of 50% aqueous pyridine and the reaction mixture is then stirred for 10 minutes at this temperature. The blue-green dispersion formed is diluted with 300 ml. of water, cooled to room temperature and the reaction product is separated by filtration, washed and dried. The dyestuff obtained dyes polyglycol terephthalate fibres from an aqueous dispersion in clear green shades which have excellent light and sublimation fastness.

EXAMPLE 81

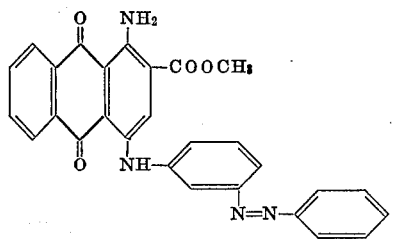

34.6 g. of 1-amino-4-bromoanthraquinone-2-carboxylic acid, 59.1 g. of 3-aminoazobenzene, 22.1 g. of anhydrous potassium acetate and 0.8 g. of copper powder are stirred in 115 g. of n-amyl alcohol for 20 hours at 115–120°. 60 g. of methanol are then added to the reaction mixture which is then cooled to room temperature whereupon the condensation product precipitates. This is dissolved in 5% sodium bicarbonate solution, filtered to clarify, the filtrate is acidified with 10% hydrochloric acid and the precipitated product is separated by filtration, washed and dried.

37.0 g. of the condensation product so obtained are boiled in 250 g. of thionyl chloride for 5 hours. The excess thionyl chloride is then removed in vacuo, the residue is taken up in 200 g. of o-dichlorobenzene and, after the addition of 67 g. of anhydrous methanol, the whole is stirred for 6 hours at 80–90°. The reaction mixture is then cooled to 0–10° whereupon the reaction product of the above formula crystallises out in a very pure form. It is filtered off, washed and dried. Polyglycol terephthalate fabric is dyed from an aqueous dispersion of the dyestuff so obtained in pure green shades which have excellent sublimation and wet fastness properties.

EXAMPLE 82

2 g. of the mixture of dyestuffs described in Example 4 are dispersed in 4000 ml. of water which contains 12 g. of sodium-o-phenyl phenolate and 12 g. of diammonium phosphate, and 100 g. of a polyglycol terephthalate fabric are introduced into the dyebath. Dyeing is performed for 1½ hours at 95–98°. The fabric is then rinsed and thoroughly washed with dilute sodium hydroxide solution and a condensation product of naphthalene sulphonic acids and formaldehyde. A green dyeing which is fast to sublimation, light and wet is obtained.

EXAMPLE 83

2 g. of the finely milled dyestuff obtained according to Example 1 are dispersed in 4000 ml. of water which contains 2 g. of a condensation product of naphthalene sulphonic acids and formaldehyde. The pH of the dyebath is adjusted to 6.5 with acetic acid. 100 g. of polyglycol terephthalate fabric are introduced into the dyebath at 40°, the bath is heated within 15 minutes to 120° in a closed vessel and is kept for 45 minutes at this temperature. The fabric is then rinsed with water and subsequently soaped. In this way a clear, green dyeing is obtained which has excellent fastness to sublimation, wet and light.

EXAMPLE 84

Polyglycol terephthalate fabric is impregnated in a foulard at 40° with a liquor of the followign composition:

| | G. |
|---|---|
| Dyestuff according to Example 80, finely dispersed in | 30 |
| Sodium alginate | 7.5 |
| Condensation product of formaldehyde and naphthalene sulphonic acids | 10 |
| and Water | 950 |

The fabric which has been squeezed out to a liquor content of about 100% (calculated on the dry weight of the fabric) is dried at 100° and then fixed for 60 seconds at a temperature of 210°. The dyed goods are rinsed with water, soaped and dried. Under these conditions a green dyeing is obtained which is fast to washing, light and sublimation.

We claim:
1. A dyestuff free from salt-forming, water-solubilizing groups which dissociate acid in water, which dyestuff is of the formula

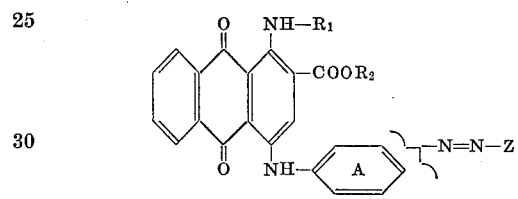

wherein
$R_1$ represents hydrogen or a lower alkyl group,
$R_2$ represents
  (a) unsubstituted lower alkyl,
  (b) lower alkyl substituted by hydroxy, alkoxy, alkoxyalkoxy, alkoxyalkoxyalkoxy or alkoxycarbonyl, each of the preceding alkoxy portions having portions from 1 to 3 carbon atoms, or phenyl,
  (c) alkenyl of at most 4 carbon atoms,
  (d) cyclohexyl,
  (e) methyl-cyclohexyl,
  (f) phenyl, or
  (g) phenyl monosubstituted by nitro, chlorine, bromine, fluorine, lower alkyl, lower alkoxy, hydroxy-lower alkyl, lower alkoxy-carbonyl, lower alkyl-sulfonyl or lower alkyl-sulfonyloxy;
Z represents
  (a) phenyl,
  (b) naphthyl, or
  (c) phenyl monosubstituted by chlorine, bromine, fluorine, nitro, lower alkyl, lower alkoxy, hydroxy lower alkyl, lower alkoxy-carbonyl, lower alkyl-sulfonyl or lower alkylsulfonyl-oxy, and
ring A bears no further substituents or is further monosubstituted by methyl, methoxy or chlorine.

2. A dyestuff as defined in claim 1 wherein $R_2$ repesents unsubstituted alkyl of at most 3 carbon atoms or such alkyl radical substituted by one of the following:
  alkoxy, alkoxyalkoxy, alkoxyalkoxyalkoxy or alkoxycarbonal each having from 1 to 3 carbon atoms per alkoxy portion, and Z represents (a) phenyl, (b) naphthyl, or (c) phenyl monosubstituted by chlorine, bromine, fluorine, lower alkyl, lower alkoxy, nitro, hydroxyl-lower alkyl, lower alkoxyl-carbonyl, lower alkyl-sulfonyl or lower alkyl-sulfonyl-oxy.

3. A dyestuff as defined in claim 1 wherein $R_2$ represents unsubstituted alkyl of at most 3 carbon atoms or such alkyl radical substituted by one of the following:
  alkoxy, alkoxyalkoxy or alkoxyalkoxyalkoxy, each alkoxy portion having at most 3 carbon atoms, Z represents phenyl or methyl-phenyl, and ring A is without further substituents or it is further substituted by one methyl group.

4. A dyestuff as defined in claim 2 which is of the formula

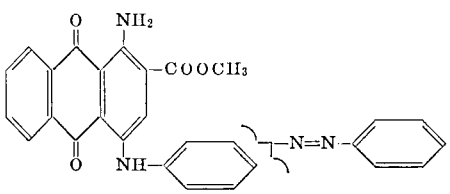

5. A dyestuff as defined in claim 2 which is of the formula

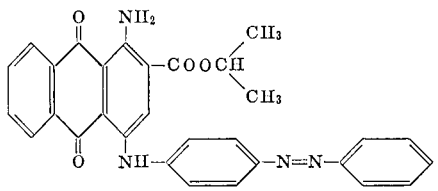

6. A dyestuff as defined in claim 2 which is of the formula

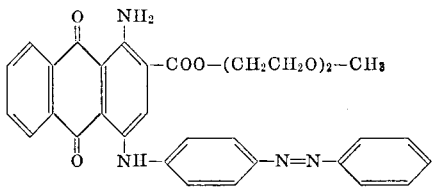

7. A dyestuff as defined in claim 2 which is of the formula

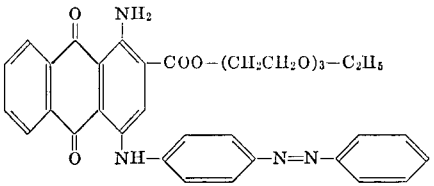

8. A dyestuff as defined in claim 2 which is of the formula

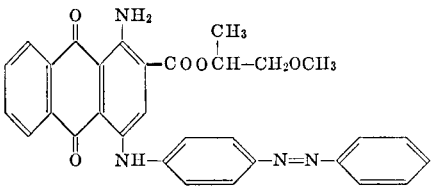

References Cited

UNITED STATES PATENTS

| | | | |
|---|---|---|---|
| 2,145,954 | 2/1939 | Semple | 260—196 X |
| 2,598,587 | 5/1952 | Moergeli | 260—207.1 |
| 2,920,072 | 1/1960 | Koelliker et al. | 260—207 |

CHARLES B. PARKER, Primary Examiner

C. F. WARREN, Assistant Examiner

U.S. Cl. X.R.

260—37, 152, 156, 158, 162, 165, 196, 202, 205 206, 207, 372; 8—41, 50